(12) United States Patent
Okada

(10) Patent No.: US 8,446,645 B2
(45) Date of Patent: May 21, 2013

(54) IMAGE READING APPARATUS

(75) Inventor: Hidekazu Okada, Hashima (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 670 days.

(21) Appl. No.: 12/748,878

(22) Filed: Mar. 29, 2010

(65) Prior Publication Data

US 2010/0328734 A1 Dec. 30, 2010

(30) Foreign Application Priority Data

Jun. 29, 2009 (JP) ................................ 2009-153725

(51) Int. Cl.
*H04N 1/04* (2006.01)
*H04N 1/40* (2006.01)

(52) U.S. Cl.
USPC ........... 358/474; 358/462; 358/483; 358/496; 358/498

(58) Field of Classification Search
USPC ... 355/53, 67, 72, 40; 396/311, 319; 399/405, 399/407
See application file for complete search history.

(56) References Cited

U.S. PATENT DOCUMENTS

| | | | |
|---|---|---|---|
| 5,858,143 A * | 1/1999 | Bright et al. | 156/86 |
| 6,223,001 B1 * | 4/2001 | Ajimu et al. | 396/311 |
| 6,924,883 B2 * | 8/2005 | Ozaki et al. | 355/53 |
| 7,107,004 B2 * | 9/2006 | Saito | 399/405 |

FOREIGN PATENT DOCUMENTS

| | | |
|---|---|---|
| JP | 2001-326793 A | 11/2001 |
| JP | 2005-005837 A | 1/2005 |

* cited by examiner

*Primary Examiner* — Akwasi M Sarpong
(74) *Attorney, Agent, or Firm* — Scully, Scott, Murphy & Presser PC

(57) ABSTRACT

An image reading apparatus including a sheet conveyance unit that conveys the sheet via a conveyance path; a reading unit, which is movable within a reading area; an image data generation control unit that is configured to control: the reading unit to read the sheet at the reading position while conveying the sheet through the reading position so as to generate an entire image data of the sheet; and generate an entire image data of the sheet; a determination data generation control unit that is configured to: control the reading unit to read the sheet by the image data generation control unit; and generate a partial image data of the sheet including the leading end portion as a determination data; and a determination unit that determines whether or not a state of conveyance of the sheet is normal based on the determination data.

11 Claims, 8 Drawing Sheets

DESCRIPTIVE VIEW OF SCANNING
FOR DETERMINATION

DESCRIPTIVE VIEW OF SCANNING
OF ENTIRE DOCUMENT

DESCRIPTIVE VIEW OF SCANNING
FOR DETERMINATION

DESCRIPTIVE VIEW OF SCANNING FOR
DETERMINATION PERFORMED
WHEN SLOPED WHITE MEMBER IS USED

DESCRIPTIVE VIEW OF SCANNING OF ENTIRE DOCUMENT PERFORMED WHEN SLOPED WHITE MEMBER IS USED

DESCRIPTIVE VIEW OF SCANNING FOR DETERMINATION PERFORMED WHEN SLOPED WHITE MEMBER IS USED

IMAGE READING APPARATUS

CROSS-REFERENCE TO RELATED APPLICATIONS

This application claims priority from Japanese Patent Application No. 2009-153725 filed on Jun. 29, 2009, the entire subject matter of which is incorporated herein by reference.

TECHNICAL FIELD

The present invention relates to an image reading apparatus that reads an image on a document and generates an image data.

BACKGROUND

A known scanner is equipped with an automatic document feeder (ADF). When such a scanner continually scans documents during automatically feeding documents by the ADF, an anomaly, such as a multi-feed, may occur in a state of conveyance and prevent the normal reading of images on the respective documents. For this reason, a known image reading apparatus extracts a side edge of a document from an image data generated by scanning through edge detection processing, or the like, thereby determining whether or not the multi-feed has occurred, based on the extracted state of the side edge.

SUMMARY

However, the known image reading apparatus scans one entire document in order to generate image data of the entire document. Further, the image reading apparatus perform the edge detection processing, or the like, to the entire document image, thereby determining whether or not the multi-feed has occurred. As a result, the determining whether or not the multi-feed is required much time.

In view of above, the present invention provides an image reading apparatus quickly detecting an anomaly state of conveyance of a document.

DETAILED DESCRIPTION

<General Overview>

Figure 1:
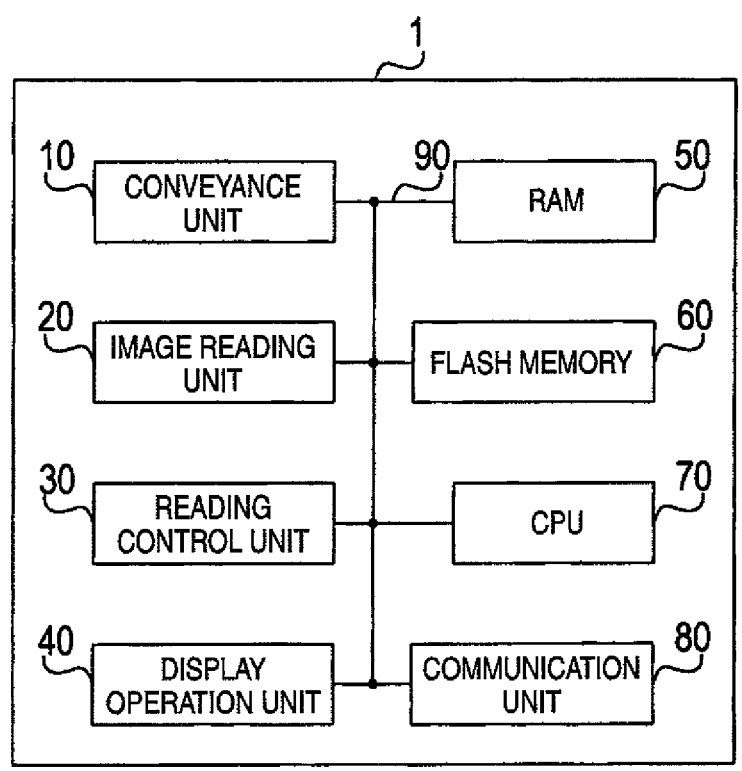
FIG. 1 is a block diagram showing a configuration of a scanner.

In view of above, according to first exemplary embodiment of the invention, An image reading apparatus comprising: a sheet placement unit on which a sheet is placed; a sheet output unit; a sheet conveyance unit that conveys the sheet from the sheet placement unit to the sheet output unit via a conveyance path; a reading unit, which is movable within a reading area provided along the conveyance path, and which reads the sheet in the reading area; an image data generation control unit that is configured to: control the reading unit to move to a reading position of the reading area; control the sheet conveyance unit to convey the sheet; control the reading unit to read the sheet at the reading position while conveying the sheet through the reading position so as to generate an entire image data of the sheet; and generate an entire image data of the sheet; a determination data generation control unit that is configured to: control the reading unit to read the sheet during a period from when a leading end portion of the sheet reaches the reading area until when the reading unit reaches the reading position by the image data generation control unit; and generate a partial image data of the sheet including the leading end portion as a determination data; and a determination unit that determines whether or not a state of conveyance of the sheet is normal based on the determination data.

Accordingly, the determination data are generated before generation of the entire image of the document. Therefore, when compared with a determination based on the entire image data of the document, it is possible to cut the time required to scanning for determination of the state of conveyance of a document. Further, since the determination data are partial image data of the document, the time required to analyze data for determination can be reduced as compared with the determination based on the entire image of the document provided to the user. Consequently, an anomaly state of conveyance can immediately be detected.

It becomes possible to scan a document for the determination at a reading position or an upstream position with respect to the reading position in the conveyance direction in the reading area. Consequently, the determination can be made without reversely conveying the document in the conveyance direction, and an anomaly state of conveyance can be detected while an increase in processing load is suppressed.

Specifically, according to second exemplary embodiment of the invention, the determination data generation control unit comprises: a conveyance stop unit that is configured to: control the sheet conveyance unit to temporarily stop conveyance of the sheet while the leading end portion of the sheet is in an upstream of the reading position in the reading area of a sheet conveyance direction; and define a position corresponding to the leading end portion of the temporality stopped sheet as a determination position; a determination data generation unit that is configured to: when the conveyance stop unit stops the conveyance of the sheet, control the reading unit to move within a determination area, which includes the determination position, in the reading area; control the reading unit to read the sheet while the reading unit is moving within the determination area; and generate the determination data.

According to third exemplary embodiment of the invention, the determination data generation control unit comprises: a positioning unit that positions the reading unit at the determination position that is positioned in an upstream of the reading position in the reading area of a sheet conveyance direction; and a determination data generation unit that is configured to: control the sheet conveyance unit to convey the sheet by the leading end portion of the sheet reaches the reading position at the latest in order to pass the sheet through the determination position; control the reading unit to read the sheet while conveying the sheet; and generate the determination data.

Accordingly, it becomes possible to quickly detect an anomaly state of conveyance. Incidentally, when the state of conveyance of the document determine, another determination way, which extract a side edge of the document part and determine the multi-feed, skewing of a document, or the like, according to the state of the side edge, is considerable, in addition to determination way on the basis of white levels of respective pixels in the determination data.

According to fourth exemplary embodiment of the invention, further comprising: a transparent member that is provided in the reading area along the conveyance path; and a white member that comprises a restriction face for restricting the sheet passing through the reading area from being separated from the transparent member, wherein the reading unit is provided at a position facing the sheet passing through the reading area with sandwiching the transparent member therebetween, wherein the restriction face of the white member comprises: a first restriction section, which corresponds to the determination area; and a second restriction section corresponding to an area, which is downstream of the determination position in the sheet conveyance direction, which includes the reading position, and which dose not overlap with the determination area, wherein a first difference level is a difference of white level between an section of the sheet and a background part of the sheet in a image data generated by reading the sheet that is restricted by the first restriction section, wherein a second difference level is a difference of white level between an section of the sheet and a background part of the sheet in a image data generated by reading the sheet restricted by the second restriction section, wherein a first distance is a distance between the sheet and the transparent member in the first restriction section, wherein a second distance is a distance between the sheet and the transparent member in the second restriction section, and wherein the first distance is set to be greater than the second distance such that the first difference level is becomes greater than second difference level.

Accordingly, compared with the scanned image data provided to the user, the difference of white level between the document part and the background part of the document in the determination data can be much greater. Thus, it becomes possible to specify the document part in the determination data more accurately, and the side edge of the document can be specified further accurately. Therefore, it is possible to determine the state of conveyance of a document more accurately.

On the other hand, since a distance between the first restriction section (determination section) and the transparent member is greater than a distance between the second restriction section (reading section) and the transparent member, the document cannot sufficiently be restricted with respect to the transparent member in the determination area, and it will be impossible to restrict the document into contact with the transparent member. When the document is scanned for determination while remaining out of contact with the transparent member, a white level of the document part in determination data is deteriorated.

According to fifth exemplary embodiment of the invention, the determination unit specifies a contour of an section formed from pixels, whose white levels are lower than a predetermined threshold value, in the determination data, wherein the determination unit determines whether or not a state of conveyance of the sheet is normal by regarding the contour as a side edge of the sheet of the determination data, wherein the predetermined threshold value is a prediction value predicted as a maximum value of a white level of a pixel corresponding to the first restriction section in the determination data or a corrected value to which a correction value considering an error by scanning operation is added to the prediction value.

Accordingly, when the document is scanned while remaining out of contact with the transparent member, it is possible to prevent the document part in the generated determination data from being erroneously specified as a background part. Therefore, the side edge of the document can accurately be specified, and the state of conveyance of the document can accurately be determined.

According to sixth exemplary embodiment of the invention, the determination data generation control unit generates the partial image data with a unique resolution that differs from a resolution of the entire image data generated by the image data generation control unit.

If a scanning resolution is set to a low level and a determination is made according to the entire image data generated by the scanning, the accuracy of determination is deteriorated. However, according to above exemplary embodiment of the image reading apparatus, since the determination data are generated at a unique resolution, deterioration of the accuracy of determination can be prevented even when the scanning resolution is set to a low level. Therefore, the state of conveyance can accurately be determined.

<Exemplary Embodiments>

Hereunder, embodiments of the present invention are described by reference to the drawings. The embodiments of present invention are not limited to the following embodiments and can modify various forms as long as the embodiments within a technical scope of the present invention.

First, the configuration of a scanner 1 equipped with an Automatic Document Feeder (ADF) in the embodiment is described by reference to a block diagram shown in FIG. 1. The scanner 1 includes a conveyance unit 10 for automatically feeding documents; an image reading unit 20 including a CIS (Contact Image Scanner), or the like, that scans a document conveyed by the conveyance unit 10; a reading control unit 30 that controls the image reading unit 20 to scan the document, thereby producing image data; a display operation unit 40 that receives various operations performed by a user and that displays a various information; an RAM 50 and a flash memory 60 that store various information; a CPU 70 that performs various processing according to a program stored in the flash memory 60 and that control the scanner 1 in a centralized control; and a communication unit 80 that is connected to a LAN and that communicates with an PC, or the like (not shown). These elements are interconnected by a bus 90.

Figure 2:
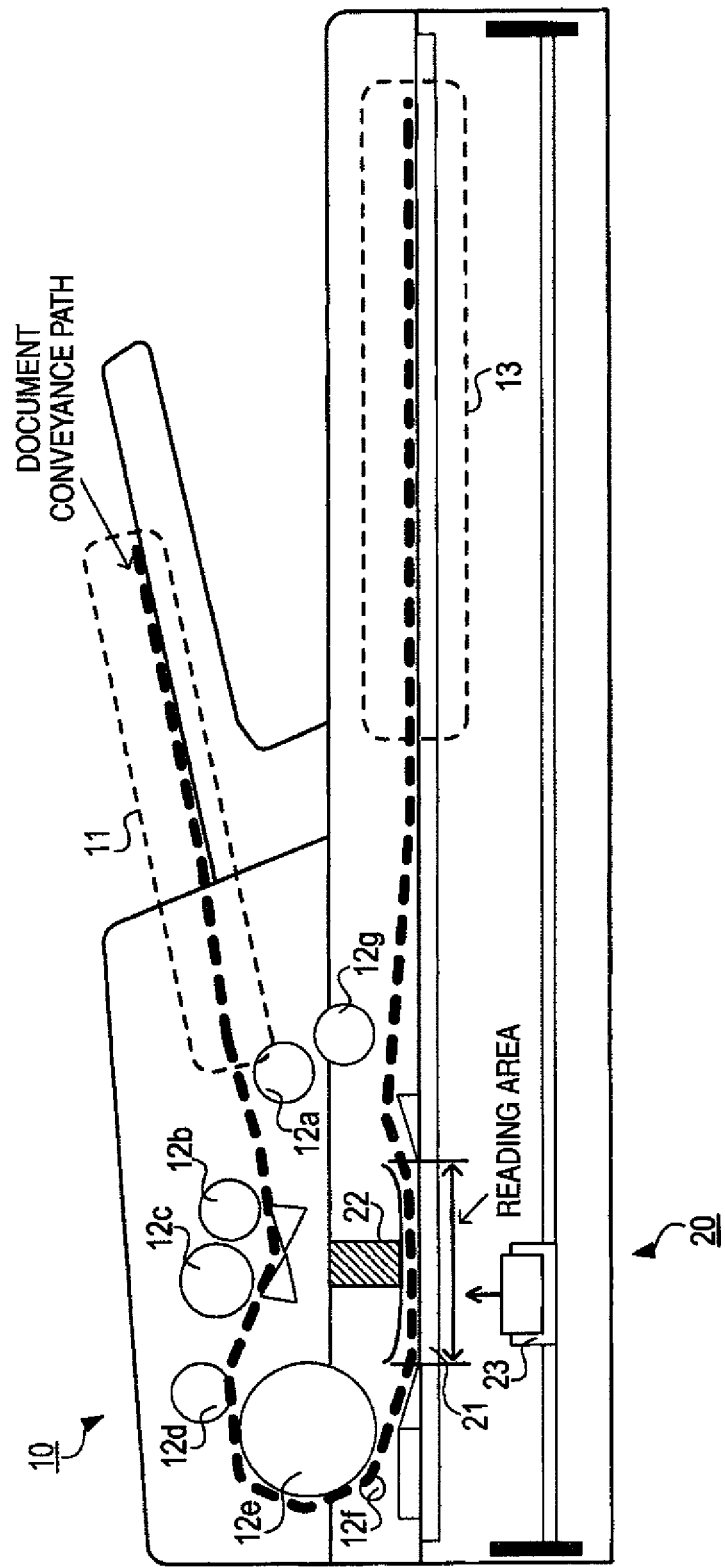
FIG. 2 is a cross sectional view showing an overview of an entire structure of the scanner.

A detailed configuration of the conveyance unit 10 and the image reading unit 20 are described by reference to a cross sectional view shown in FIG. 2 that showing an overview of an entire structure of the scanner 1. As shown in FIG. 2, the conveyance unit 10 includes a document placement unit 11, in which a document to be scanned is placed, and rollers 12a to 12g that convey the document placed on the document placement unit 11 to a document output unit 13 along a document conveyance path. The image reading unit 20 includes an ADF glass 21 disposed in a reading area, in which a conveyed document is scanned, in the document conveyance path area; a white member 22 that restricts a position of the document passing through the reading area with respect to the ADF glass 21; and the CIS 23 that is placed at a position, in which the CIS faces the document passing through the reading area with the ADF glass 21 sandwiched therebetween, and that scans a document being present in the reading area.

The CIS 23 is movable within a determination range corresponding to the reading area along a conveyance direction of the document. A direction parallel to the conveyance direction of the document is called as a sub-scan direction. A direction orthogonal to the conveyance direction of the document is called as a main scan direction that is parallel to a contact face between the ADF glass 21 and the document. The document is scanned by the CIS sandwiched the ADF glass 21.

The white member 22 includes a restriction face and a supporting portion. An entire area of the restriction face is white color. The supporting portion is supporting the restriction face. The white member 22 has a function of guiding the document such that the document passing through the reading area contacts the ADF glass 21, thereby restricting the position of the document with respect to the ADF glass 21. The white member 22 also has a function adjusting a white standard for a reading level of the CIS 23 by the CIS 23 reading the white member 22. A face of the white member 22 that is facing the ADF glass 21 and that restricts the document so as to contact the ADF glass 21. The face of the white member 22 is hereunder referred as the restriction face.

Figure 4A:
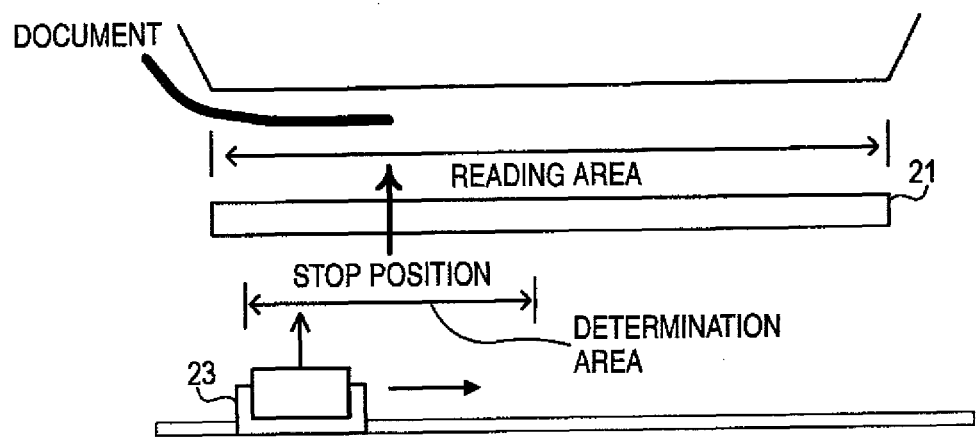
FIGS. 4A and 4B are descriptive views showing general operation, such as Contact Image sensor (CIS), scanning document.
Figure 4B:
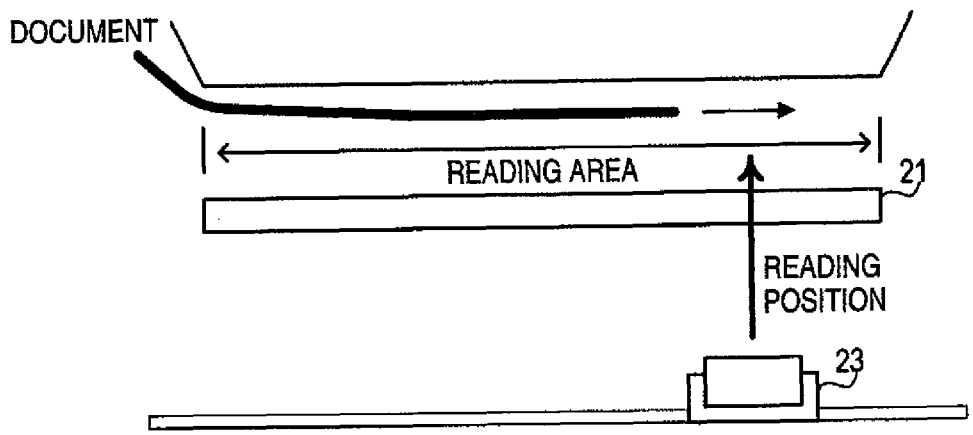

In a first embodiment, the face of white member 22 restricting the document with respect to the ADF glass 21 disposed in the document reading area includes a horizontal section horizontal to the ADF glass 21. FIGS. 4A and 4B provide descriptive views that show an overview of scanning operation using the white member 22. As illustrated by the descriptive drawings, the reading area is provided over the horizontal section. In a contact face of ADF glass 21 contacting the document, a determination area is provided as a area facing a upstream partial section of conveyance in the reading area (described also as a "determination section"). In the contact face of the ADF glass 21, a reading position is provided in area that is a downstream of the determination area in the conveyance direction and is facing to a partial section of the reading area (described also as a "reading section").

Figure 3:
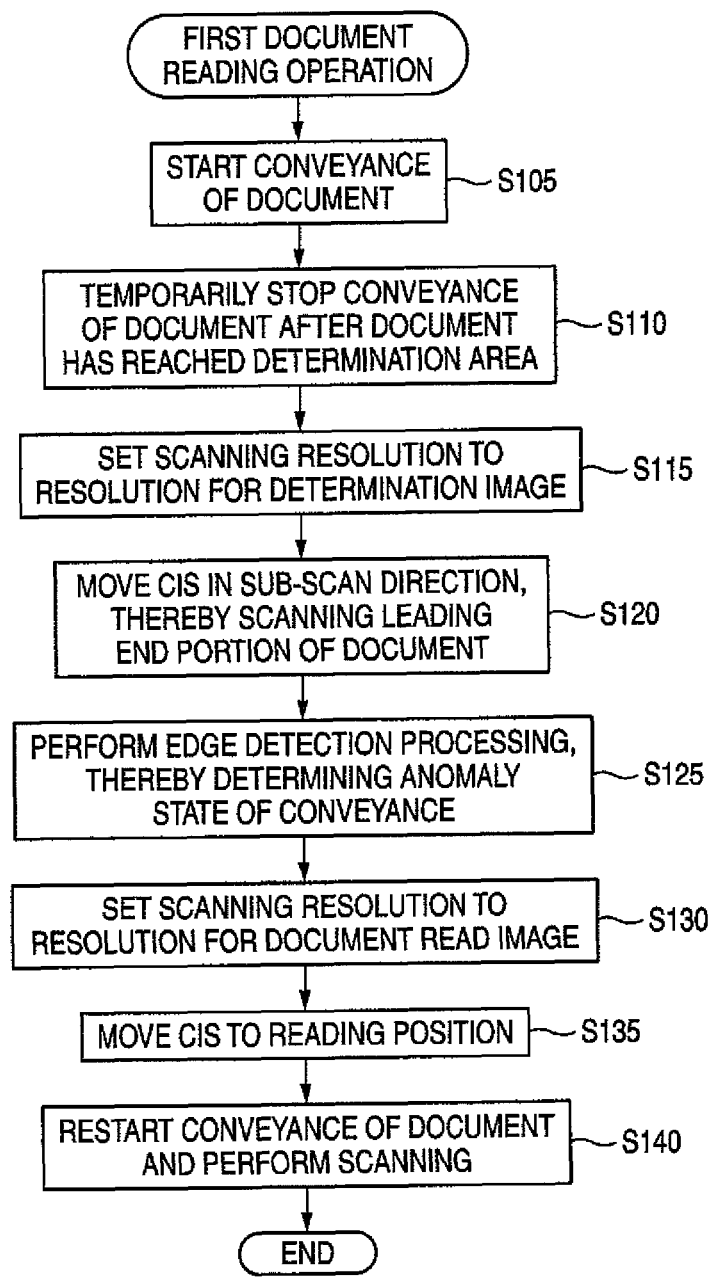
FIG. 3 is a flowchart showing first document read processing.

By reference to a flowchart shown in FIG. 3, the scanner 1 in the first embodiment perform a first document read processing that is a process conveying the document placed on the document placement unit 11 along the document conveyance path and reading an image on the document. The processing is started when the user orders scanning operation by the display operation unit 40. The processing is also repeatedly performed with respective documents while a plurality of documents placed on the document placement unit 11 is scanned by automatic document feeding operation. An operation of the CIS 23, or the like, scanning the document is described by reference to the descriptive views shown in FIGS. 4A and 4B.

The CPU 70 of the scanner 1 starts conveying the topmost document placed on the document placement unit 11 (S105). The document is then conveyed by the rollers 12a to 12g, and the like, along the document conveyance path.

When the leading end of the document reaches the stop position provided in the determination area of the reading area, the CPU 70 temporarily stops conveyance of the document (S110) and sets a scanning resolution to a given uniquely resolution for a determination image differing from a resolution for a document read image (S115). In the present embodiment, the stop position is set in the vicinity of a center portion of the determination area.

The CPU 70 subsequently controls the reading control unit 30 to scan a leading end of the document (S120). Specifically, the read control unit 30 first moves the CIS 23 to a point corresponding to the most upstream position in the determination area in the conveyance direction. As shown in FIG. 4A, the scanning is performed while the CIS 23 is being moved at speed commensurate with the scanning resolution to the point corresponding to the most downstream position in the determination area (namely, while the CIS 23 is being moved at speed corresponding to the scanning resolution in the sub-scan direction). The image data produced through scanning operation are saved as determination data in the RAM 50.

Subsequently, the CPU 70 performs the determination data stored in the RAM 50 to well-known edge detection processing for extracting a side edge of a document. It is determined whether or not the multi-feed, skewing of a document, or the like, has occurred, according to a state of the side edge of the document, thereby detecting an anomaly state of conveyance of the document (S125). When an anomaly is detected, the scanner 1 may inform the user of the anomaly or abort scanning operation.

Subsequently, the CPU 70 sets the scanning resolution to a resolution for the document read image given by the user (S130).

The CPU 70 controls the reading control unit 30 to move the CIS 23 to a point corresponding to a downstream reading position with respect to the determination area in the conveyance direction of a document in the reading area (S135). The conveyance, which is temporarily stopped, of the document is restarted, and the conveyance unit convey the document so as to pass by the reading position at the speed corresponding with the scanning resolution, as shown in FIG. 4B. Simultaneously, the CPU 70 controls the reading control unit 30 to perform scanning operation of the CIS 23, thereby reading an image in the entire document. The generated image data saved in the RAM 50 as document read image data provided to the user (S140). When the final document passed by the reading position and reached the document output unit 13, the processing ends.

In the first embodiment, the scanner 1 temporarily stops conveyance of a document when the leading end of the document reached a center position of the determination area, and the CIS 23 is moved within a determination range corresponding to the determination area and scans a reading end of the document. The scanner 1 detects an anomaly state of conveyance according to the determination data by the scanning. Consequently, when compared with a case where an anomaly state of conveyance is detected on the basis of scanned image data of the entire document, the anomaly can immediately be detected.

The scanner 1 performs scanning operation for determination with the unique resolution differing from the resolution for a document read image. Therefore, for instance, when compared with the case where an anomaly state of conveyance is detected on the basis of a document read image, it is possible to prevent deterioration of accuracy of detection of an anomaly state of conveyance even when the resolution for a document read image is set to a low level.

Figure 6A:
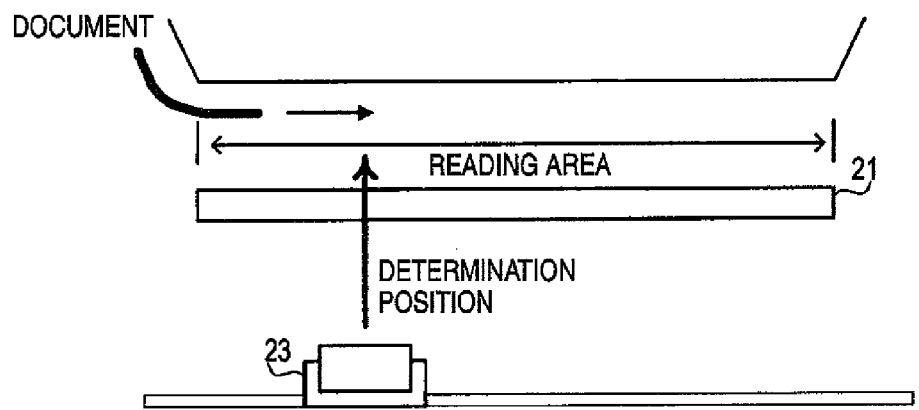
FIGS. 6A and 6B are descriptive views showing general operation, such as CIS, scanning document.

In a second embodiment, the face of white member 22 restricting the document with respect to the ADF glass 21 disposed in the document reading area includes a horizontal section horizontal to the ADF glass 21, as in the case with the first embodiment. FIGS. 6A and 4B provide descriptive views that show an overview of scanning operation using the white member 22. As illustrated by the descriptive drawings, the reading area is provided over the horizontal section.

As described in FIG. 6A, in the face of the ADF glass 21 contacting the document, a determination position is set in a area facing to a upstream partial section of conveyance direction in the reading area (described also as a "determination section"). Further, as described in connection with FIG. 4B, in the contact face of the ADF glass 21, the reading position is provided in an area that is downstream of the determination position in the conveyance direction and that is facing to a partial section of the reading area (described also as a "reading section").

Figure 5:
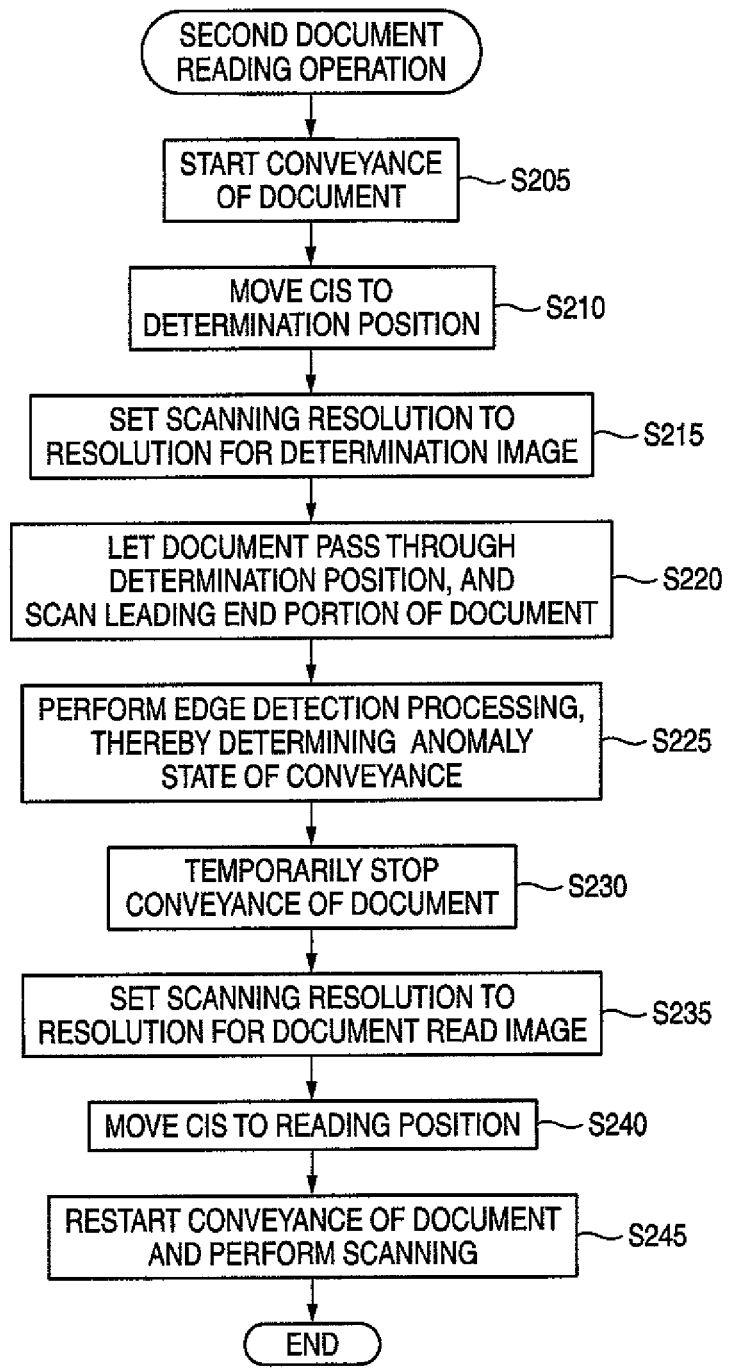
FIG. 5 is a flowchart showing second document read processing.

By reference to a flowchart shown in FIG. 5, the scanner 1 perform a second document read processing that is process conveying the document placed on the document placement unit 11 along the document conveyance path and reading an image on the document. The processing is started when the user orders scanning operation by the display operation unit 40, as in the case of first document reading operation. The processing is also repeatedly performed with respective documents while a plurality of documents placed on the document placement unit 11 is scanned by unit of automatic document feeding operation. The operation of the CIS 23, or the like, scanning documents is described by reference to the descriptive views shown in FIG. 6A, or the like.

The CPU 70 of the scanner 1 starts conveying the topmost document placed on the document placement unit 11 (S205). The document is then conveyed by the rollers 12a to 12g, and the like, along the document conveyance path. As described in connection with FIG. 6A, the CPU 70 controls the reading control unit 30 to move the CIS 23 to a point corresponding to an upstream determination position with respect to the reading position in the reading area in the conveyance direction of the document (S210).

When the document being conveyed reaches a position in front of the reading area, the CPU 70 sets the scanning resolution to a given uniquely resolution for a determination image differing from the resolution for a document read image. Subsequently, the document is conveyed at speed commensurate with the resolution for a determination image (S215).

As shown in FIG. 6A, the CPU 70 subsequently controls the reading control unit 30 to perform scanning operation of the CIS 23 during the leading end of the document passing trough the determination position (S220) and saves image data generated by scanning as determination data in the RAM 50.

Subsequently, the CPU 70 subjects the determination data stored in the RAM 50 to well-known edge detection processing for extracting the side edge of the document. It is determined whether or not the multi-feed, skewing of a document, or the like, has occurred, according to a state of the side edge of the document, thereby detecting an anomaly state of conveyance of the document (S225). When an anomaly is detected, the scanner 1 may inform the user of the anomaly or abort the scanning operation.

Subsequently, the CPU 70 temporarily stops conveyance of the document (S230). The position, where conveyance is temporarily stopped, is a point, where the point is disposed the leading end of the document corresponding to the downstream reading position with respect to the determination position or disposed upstream thereof. The scanning resolution is set to the resolution for a document read image given by the user (S235).

The CPU 70 controls the reading control unit 30 to move the CIS 23 to a point corresponding to a downstream reading position with respect to the determination position in the reading area in the conveyance direction of a document (S240). The conveyance, which is temporarily stopped, of the document is restarted, and the conveyance unit conveys the document so as to pass by the reading position at the speed corresponding with the scanning resolution, as shown in FIG. 4B. Simultaneously, the CPU 70 controls the reading control unit 30 to perform scanning operation of the CIS 23, thereby reading an image in the entire document. The generated image data are saved in the RAM 50 as document read image data provided to the user (S245). When the document passed by the reading position and reached the document output unit 13, the process ends.

In the second embodiment, the scanner 1 disposed the CIS 23 to the determination position before the document reaches the reading area and scans the leading end portion of the document during the document passing trough the determination position, thereby producing determination data. The scanner 1 detects an anomaly state of conveyance according to the determination data by the scanning. Consequently, when compared with a case where an anomaly state of conveyance is detected on the basis of scanned image data of the entire document, the anomaly can be detected immediately.

The scanner 1 performs scanning operation for determination with the unique resolution differing from the resolution for the document read image. Therefore, for instance, when compared with the case where an anomaly state of conveyance is detected on the basis of a document read image, it is possible to prevent deterioration of accuracy of detection of an anomaly state of conveyance even when the resolution for a document read image is set to a low level.

Figure 6B:
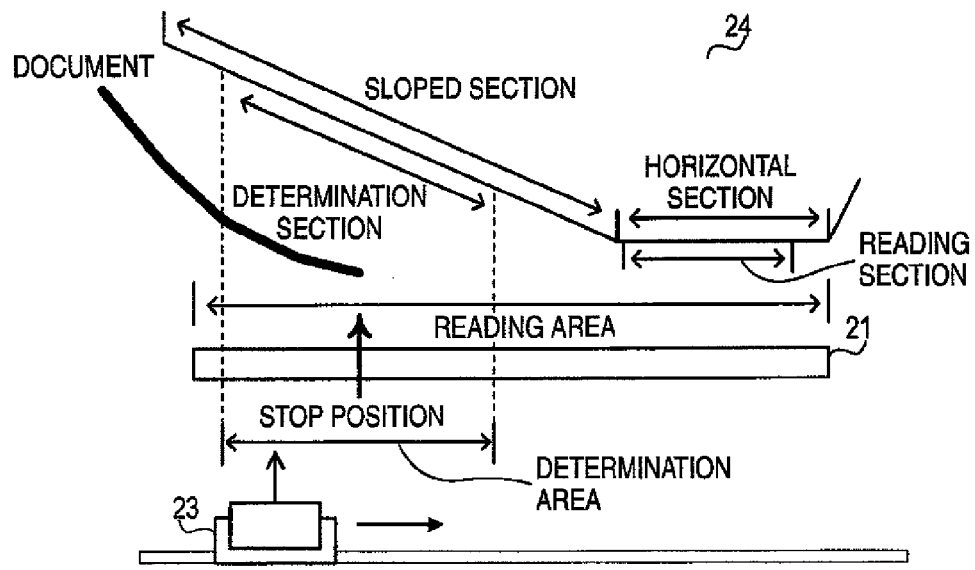
Figure 7A:
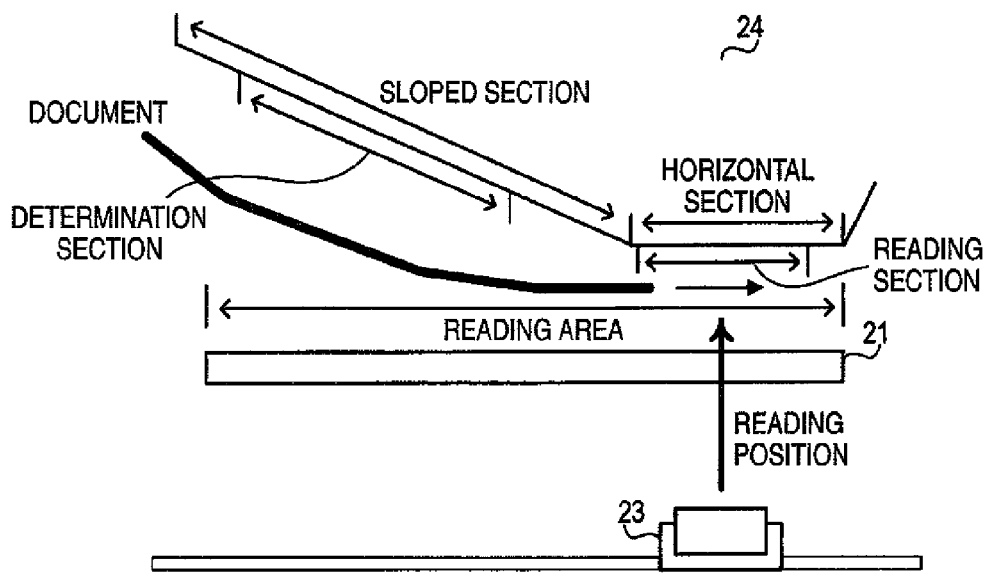
FIGS. 7A and 7B are descriptive views showing general operation, such as CIS, scanning document.
Figure 7B:
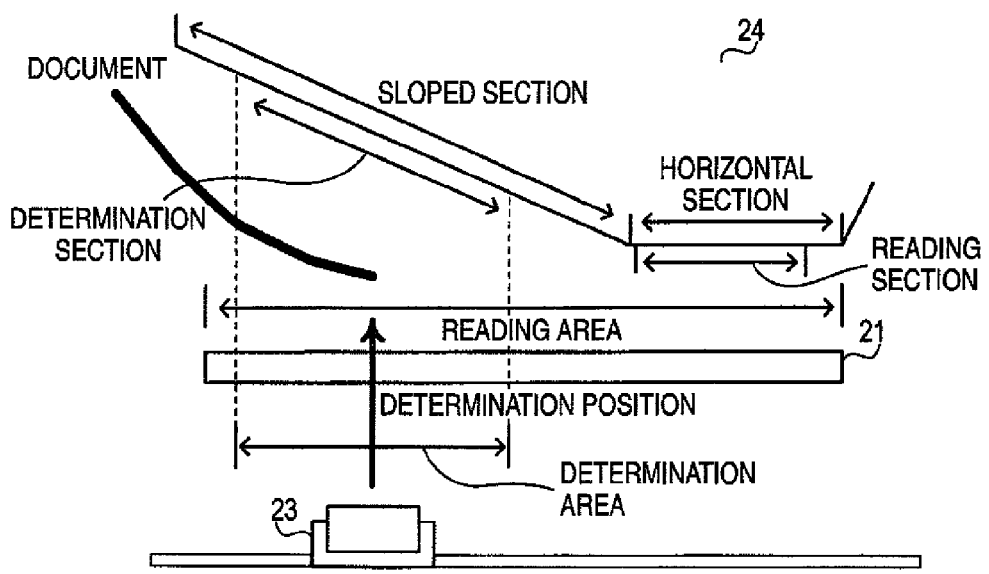

In third embodiment, in place of the white member 22 provided in the scanner 1 in first embodiment and second embodiment, a sloped white member 34 whose restriction face for restricting the document with respect to the ADF glass 21 disposed in the document reading area includes a horizontal section horizontal to the ADF glass 21 and a sloped section having a predetermined inclination with respect to the ADF glass 21 of the image reading unit 20. FIGS. 6B, 7A, and 7B show descriptive views that show an overview of scanning operation using the sloped white member 24. As illustrated by the descriptive drawings, the sloped section is provided so as to face an upstream area in the reading area in the conveyance direction, and the level section is provided so as to face a downstream area in the reading area in the conveyance direction. The sloped section is made such that a distance between the sloped section and the ADF glass 21 becomes greater toward an upstream direction.

In the third embodiment, as shown in FIGS. 6B, 7A, and 7B, the determination area is provided as a area corresponding to a section facing a partial section of the sloped section (described also as a "determination section") on the face of the ADF glass 21 contacting a document, and the determination position is provided at a center position of the determination area. In the contact face of the ADF glass 21, the reading position is provided in an area corresponding to a section facing a partial section of the horizontal section (described also as a "reading section").

Figure 8:
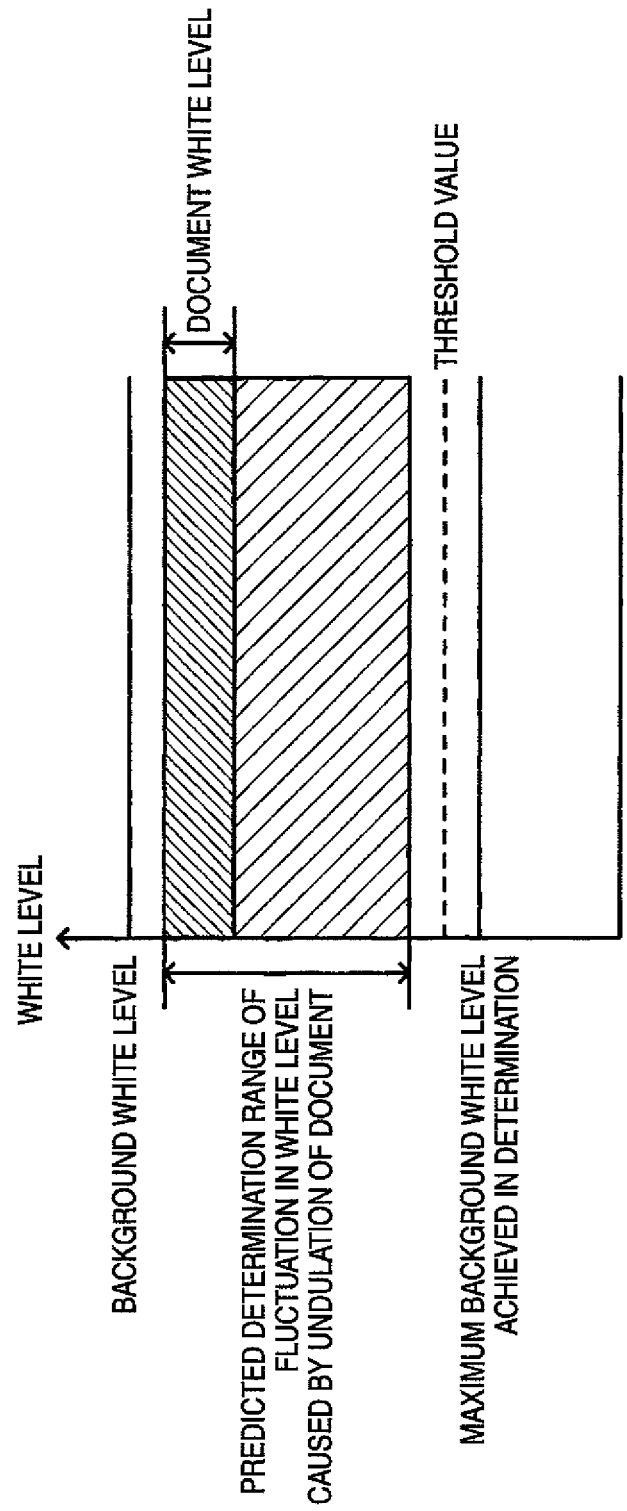
FIG. 8 is a descriptive view showing a threshold value when a document part and a background part are determined.

It is called as a "white level" that is a pixel level of a pixel or a pixel area in a image read by the CIS 23 (reading unit) in the restriction face of the white member or the document part (a margin of the document). For instance, a range of the white level has 256 steps (in a range of 0 to 255). A maximum background white level in the determination takes the maximum value predicted as a white level of a background part of the document (the white member) in the determination data. A background white level in the reading position takes a value predicted as a white level of a background part of the document (the white member) in the image data that is generated by scanning operation while the CIS 23 is placed at the reading position. A document white level takes a value predicted as a white level for the document part in the scanned image while the document contacts with the ADF glass 21. In the reading area, since the reflection ratio of the white member is greater than the reflection ratio of the document part in general, the background white level is greater than the white level of the document. In the determination area, since the document is more closely to the CIS than the restriction face, the document white level is greater than the maximum background white level. As result, the background white level is greater than the document white revel that is greater than the maximum background white level (see FIG. 8). In addition, since the document white level is changing according to a color of the document, the document white level becomes one value within one range. A tilt angle of the sloped section of the white member and the determination area are made such that at least a difference level between the maximum background white level and the minimum value of the document white level in the determination becomes greater than a difference level between the maximum background white level and the document white level in the reading position.

Even in the third embodiment, the first document reading operation and the second document reading operation, which are substantially the same as those described in the first and second embodiments, are performed. In the third embodiment, the state of conveyance of a document in the document reading operation is determined as follows (S125 and S225).

At first, in S125, a background white level corresponding to the most downstream position in the determination area in the conveyance direction becomes the maximum background white level in the determination. In S225, the background white level at the determination position becomes the maximum background white level in the determination. In the third embodiment, a corrected value added a correction value considered an error by the scanning operation to the maximum background white level in the determination is set as a threshold value, as described in the descriptive drawing shown in FIG. 8. The maximum background white level in the determination may also be set as a threshold value.

Second, in the determination data, pixels whose white levels exceed the threshold value are taken as a document part. Pixels whose white levels are equal to or less than the threshold value are taken as a background part of a document (a sloped face of the sloped white member 24).

Third, a boundary line between the document part and the background part is specified. According to a state of the boundary line, it is determined whether or not the multi-feed, skewing of a document, or the like, has occurred, thereby detecting an anomaly state of conveyance.

In the third embodiment, the leading end of the document is scanned within the determination area of the sloped white member 24 as in the case with the first and the second embodiments. Therefore, the difference of white level between the background part and the document part in the determination data can be made greater than the image data generated by scanning of the reading section. Thus, side edge of the document can be specified more accurately. Therefore, an anomaly state of conveyance can be detected more accurately.

In the third embodiment, a value is assumed to be the maximum value of the white level of the background part or a value close to the maximum value as the threshold value, thereby specifying a document part and a background part in determination data. Even when a white level of a portion of the document part in the determination data is decreased as a result of a document situated in the determination area being scanned while undulated (namely, while a portion of the document remains out of contact with the ADF glass 21), it is possible to prevent the document part from being erroneously specified as a background part (see FIG. 8). Consequently, the side edge of the document can accurately be specified, so that the state of conveyance of the document can accurately be determined.

[Other Modification]

(1) Although the CIS 23 is used as an element for scanning a document in the above embodiments, a Charge Coupled Device (CCD) can also be used in instead of the CIS 23.

(2) In the third embodiment, the restriction face of the sloped white member 24 has an inclination. In addition, for instance, a step can also be provided at a position on the restriction face corresponding to a vicinity of a center portion of the reading area and increase an distance between an upstream side of the restriction face in the conveyance direction and the ADF glass 21. The determination area may also be set the restriction face on upstream with respect to the step, and the reading section may also be set at a position downstream with respect to the step. The distance between the upstream side of the restriction face and the ADF glass 21 is set such that at least a difference between the maximum background white level and the minimum value of the document white level in the determination becomes greater than a difference between the background white level achieved at the reading position and the maximum value of the document white level. Even when the scanner has such a configuration, a similar advantage can be achieved.

Correlation between the terms used for describing the embodiments and the terms used in claims is provided.

The scanner 1 is equivalent to an image reading apparatus. The conveyance unit 10 is equivalent to document conveyance unit. The ADF glass 21 is equivalent to a transparent member. The CIS 23 is equivalent to reading unit.

The processing pertaining to S140 and S245 correspond to image data generation control unit. The processing pertaining to S110 and S120, S210, and S220 corresponds to determination data generation control unit. The processing pertaining to S125 and S225 corresponds to determination unit. The processing pertaining to S110 is equivalent to conveyance stop unit. The processing pertaining to S120 is equivalent to determination data generation unit. Further, processing pertaining to S210 is equivalent to positioning unit, and processing pertaining to S220 is equivalent to determination data generation unit.

Moreover, a difference between the maximum background white level and the minimum value of the document white level achieved at the time of determination is equivalent to a first difference. A difference between the background white level and the maximum value of the document white level achieved at the reading position is equivalent to a second difference.

What is claimed is:

1. An image reading apparatus comprising:
   a sheet placement unit on which a sheet is placed;
   a sheet output unit;
   a sheet conveyance unit that conveys the sheet from the sheet placement unit to the sheet output unit via a conveyance path;
   a reading unit, which is movable within a reading area provided along the conveyance path, and which reads the sheet in the reading area;
   an image data generation control unit that is configured to:
      control the reading unit to move to a reading position of the reading area;
      control the sheet conveyance unit to convey the sheet;
      control the reading unit to read the sheet at the reading position while conveying the sheet through the reading position so as to generate an entire image data of the sheet; and
      generate an entire image data of the sheet;

a determination data generation control unit that is configured to:
  control the reading unit to read the sheet during a period from when a leading end portion of the sheet reaches the reading area until when the reading unit reaches the reading position by the image data generation control unit; and
  generate a partial image data of the sheet including the leading end portion as a determination data; and
a determination unit that determines whether or not a state of conveyance of the sheet is normal based on the determination data.

2. The image reading apparatus according to claim 1, wherein the determination data generation control unit comprises:
a conveyance stop unit that is configured to:
  control the sheet conveyance unit to temporarily stop conveyance of the sheet while the leading end portion of the sheet is in an upstream of the reading position in the reading area of a sheet conveyance direction; and
  define a position corresponding to the leading end portion of the temporality stopped sheet as a determination position;
a determination data generation unit that is configured to:
  when the conveyance stop unit stops the conveyance of the sheet, control the reading unit to move within a determination area, which includes the determination position, in the reading area;
  control the reading unit to read the sheet while the reading unit is moving within the determination area; and
  generate the determination data.

3. The image reading apparatus according to claim 1, wherein the determination data generation control unit comprises:
a positioning unit that positions the reading unit at the determination position that is positioned in an upstream of the reading position in the reading area of a sheet conveyance direction; and
a determination data generation unit that is configured to:
  control the sheet conveyance unit to convey the sheet by the leading end portion of the sheet reaches the reading position at the latest in order to pass the sheet through the determination position;
  control the reading unit to read the sheet while conveying the sheet; and
  generate the determination data.

4. The image reading apparatus according to claim 1, further comprising:
a transparent member that is provided in the reading area along the conveyance path; and
a white member that comprises a restriction face for restricting the sheet passing through the reading area from being separated from the transparent member,
wherein the reading unit is provided at a position facing the sheet passing through the reading area with sandwiching the transparent member therebetween,
wherein the restriction face of the white member comprises:
  a first restriction section, which corresponds to the determination area; and
  a second restriction section corresponding to an area, which is downstream of the determination position in the sheet conveyance direction, which includes the reading position, and which dose not overlap with the determination area,
wherein a first difference level is a difference of white level between an section of the sheet and a background part of the sheet in a image data generated by reading the sheet that is restricted by the first restriction section,
wherein a second difference level is a difference of white level between an section of the sheet and a background part of the sheet in a image data generated by reading the sheet restricted by the second restriction section,
wherein a first distance is a distance between the sheet and the transparent member in the first restriction section,
wherein a second distance is a distance between the sheet and the transparent member in the second restriction section, and
wherein the first distance is set to be greater than the second distance such that the first difference level is becomes greater than second difference level.

5. The image reading apparatus according to claim 2, further comprising:
a transparent member that is provided in the reading area along the conveyance path; and
a white member that comprises a restriction face for restricting the sheet passing through the reading area from being separated from the transparent member,
wherein the reading unit is provided at a position facing the sheet passing through the reading area with sandwiching the transparent member therebetween,
wherein the restriction face of the white member comprises:
  a first restriction section, which corresponds to the determination area; and
  a second restriction section corresponding to an area, which is downstream of the determination position in the sheet conveyance direction, which includes the reading position, and which dose not overlap with the determination area,
wherein a first difference level is a difference of white level between an section of the sheet and a background part of the sheet in a image data generated by reading the sheet that is restricted by the first restriction section,
wherein a second difference level is a difference of white level between an section of the sheet and a background part of the sheet in a image data generated by reading the sheet restricted by the second restriction section,
wherein a first distance is a distance between the sheet and the transparent member in the first restriction section,
wherein a second distance is a distance between the sheet and the transparent member in the second restriction section, and
wherein the first distance is set to be greater than the second distance such that the first difference level is becomes greater than second difference level.

6. The image reading apparatus according to claim 3, further comprising:
a transparent member that is provided in the reading area along the conveyance path; and
a white member that comprises a restriction face for restricting the sheet passing through the reading area from being separated from the transparent member,
wherein the reading unit is provided at a position facing the sheet passing through the reading area with sandwiching the transparent member therebetween,
wherein the restriction face of the white member comprises:
  a first restriction section, which corresponds to the determination area; and
  a second restriction section corresponding to an area, which is downstream of the determination position in the sheet conveyance direction, which includes the reading position, and which dose not overlap with the determination area, wherein a first difference level is a difference of white level between an section of the sheet and a background part of the sheet in a image data generated by reading the sheet that is restricted by the first restriction section, wherein a second difference level is a difference of white level between an section of the sheet and a background part of the sheet in a image data generated by reading the sheet restricted by the second restriction section, wherein a first distance is a distance between the sheet and the transparent member in the first restriction section, wherein a second distance is a distance between the sheet and the transparent member in the second restriction section, and wherein the first distance is set to be greater than the second distance such that the first difference level is becomes greater than second difference level.

7. The image reading apparatus according to claim 4,
wherein the white member comprises a horizontal section,
wherein the white member comprises a sloped section, which inclined with respect to the horizontal section,
wherein the horizontal section comprises the second restriction section, and
wherein the sloped section comprises the first restriction section.

8. The image reading apparatus according to claim 4,
wherein the determination unit specifies a contour of an section formed from pixels, whose white levels are lower than a predetermined threshold value, in the determination data,
wherein the determination unit determines whether or not a state of conveyance of the sheet is normal by regarding the contour as a side edge of the sheet of the determination data,
wherein the predetermined threshold value is a prediction value predicted as a maximum value of a white level of a pixel corresponding to the first restriction section in the determination data or a corrected value to which a correction value considering an error by scanning operation is added to the prediction value.

9. The image reading apparatus according to claim 5,
wherein the determination unit specifies a contour of an section formed from pixels, whose white levels are lower than a predetermined threshold value, in the determination data,
wherein the determination unit determines whether or not a state of conveyance of the sheet is normal by regarding the contour as a side edge of the sheet of the determination data,
wherein the predetermined threshold value is a prediction value predicted as a maximum value of a white level of a pixel corresponding to the first restriction section in the determination data or a corrected value to which a correction value considering an error by scanning operation is added to the prediction value.

10. The image reading apparatus according to claim 6,
wherein the determination unit specifies a contour of an section formed from pixels, whose white levels are lower than a predetermined threshold value, in the determination data,
wherein the determination unit determines whether or not a state of conveyance of the sheet is normal by regarding the contour as a side edge of the sheet of the determination data,
wherein the predetermined threshold value is a prediction value predicted as a maximum value of a white level of a pixel corresponding to the first restriction section in the determination data or a corrected value to which a correction value considering an error by scanning operation is added to the prediction value.

11. The image reading apparatus according to claim 1,
wherein the determination data generation control unit generates the partial image data with a unique resolution that differs from a resolution of the entire image data generated by the image data generation control unit.

* * * * *